United States Patent [19]
Wayne

[11] 3,743,961
[45] July 3, 1973

[54] INCLINED AIR CORE SOLENOID FIELDS FOR LASERS

[75] Inventor: Robert Joseph Wayne, East Hartford, Conn.

[73] Assignee: The United States of America as represented by the Secretary of the Navy, Washington, D.C.

[22] Filed: Feb. 9, 1972

[21] Appl. No.: 224,788

[52] U.S. Cl................. 331/94.5, 330/4.3, 350/151, 315/344, 313/79
[51] Int. Cl............................................. H01s 3/10
[58] Field of Search.................... 331/94.5; 350/151; 315/344; 313/79

[56] References Cited
UNITED STATES PATENTS
3,521,193   7/1970   Wingfield.......................... 331/94.5

Primary Examiner—Ronald L. Wibert
Assistant Examiner—R. J. Webster
Attorney—R. S. Sciascia and P. S. Collignon

[57] ABSTRACT

A laser plasma discharge bore or tube having one or more pairs of air core solenoids in parallel or angularly disposed flux aligned positions across the discharge bore to provide linear discharge magnetic fields proportional to current for stabilized laser action that is uniform and non-saturable and adjustable in amplitude and applicable to cross-field lasers and cross-field scan lasers alike.

4 Claims, 10 Drawing Figures

PATENTED JUL 3 1973

INCLINED AIR CORE SOLENOID FIELDS FOR LASERS

BACKGROUND OF THE INVENTION

This invention relates to optical lasers and more particularly to the means of producing magnetic lines of flux across the laser discharge bore in a uniform, linear and inclined flux density profile that is adjustable and controllable in intensity to produce uniform lasing discharge.

Present means for generating magnetic fields are by using large heavy iron core electromagnets coupled to long pole pieces which are arranged above and below and to the sides of a laser discharge axis. To increase the field strength there must be an increase in current through each iron core electromagnetic since the gap is fixed. The usual such electromagnet poles are about twelve inches long and about one and one-fourth inches wide separated by one inch to provide the necessary field strength. The field increases non-linearly with current due to saturation of the core and falls off steeply from the centerline of the pole pieces. The only way to change the field taper, or slope at the laser discharge, is to physically move the entire pole piece assembly along the laser. Also, the range of slopes which are constant for one-half inch or more (assuming this to be the diameter of the discharge bore) is limited as are the values of high magnitude flat sloped fields which would require much broader pole pieces. Such high peaked and narrow magnetic flux fields are mostly useless because of the wrong slope sign and the majority of the rest of the field is useless for the reason that there is too small a field in the fringe area and the field extending on either side of the discharge bore is not needed due to laser discharge tube fins. Permanent magnets, such as light weight ferrites, are without a doubt the most economical way of producing large fields over long lengths. Unfortunately, when used in conjunction with long pole pieces and electomagnet coils the same problems are faced as with iron core electromagnets except that the input power requirements are reduced to achieve the needed field magnitudes while increasing the weight of the structure.

SUMMARY OF THE INVENTION

The present invention conceives the use of pairs of air core coils or solenoids to generate magnetic field profiles linearly with current across a laser discharge bore. Since there is no iron, the field increases linearly with current and is generally uniform across the gap. Further, iron return flux paths are not necessary. If the coils or solenoids are inclined with respect to each other, sloping field profiles are produced and the slope is very nearly constant, positive, and linear with current. Such solenoid pairs can be used parallel or inclined across either cross-field laser or cross-field scan laser discharge bores and the optical path of any folded cavity can go through the coil, when necessary, without destroying the linear, adjustable, and taper characteristics of the air core field profiles. While the invention is readily useful for $CO_2$ lasers, it is useful for all laser discharge. It is accordingly, a general object of this invention to provide a laser discharge with air core coils or solenoids paired at relative angles to produce controlled linear magnetic field profiles of adjustable slope and intensity across a laser discharge bore of uniform flux density which will not saturate or distort.

BRIEF DESCRIPTION OF THE DRAWINGS

These and other objects and the attendant advantages, features and uses will become more apparent to those skilled in the art of lasers as a more detailed description proceeds when considered along with the accompanying drawings, in which.

DESCRIPTION OF THE PREFERRED EMBODIMENT

Figure 1:
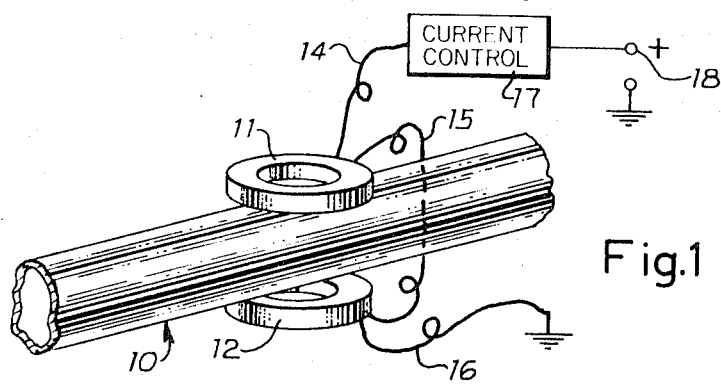
FIG. 1 illustrates a parallel arrangement of solenoids with a lasing tube therebetween in accordance with the invention.
Figure 3:
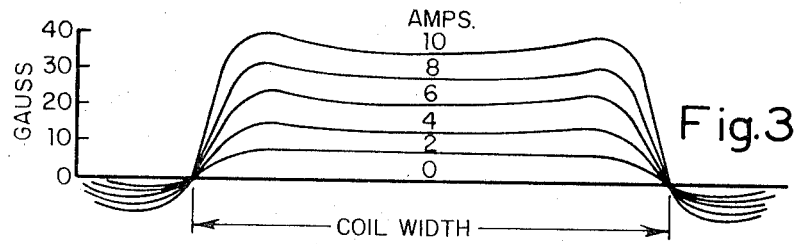
FIG. 3 illustrates a graph of the flux density with respect to coil size and current applied for parallel solenoids.

Referring more particularly to FIG. 1 a lasing discharge tube 10 of a cross-field scan laser or cross-field laser device is shown passing between solenoid coils 11 and 12 spaced in parallel relation to cause flux lines from the coil centers to pass through the lasing tube. Coils 11 and 12 should be of sufficient size to establish the flux field completely across the diameter of the lasing tube 10. The flux density, or B in guass, is independent of coil diameter, area, or shape and accordingly the coils could have a length of 20:1 or any shape to ideally fit the geometry of the laser discharge bore. The coils 11 and 12 are coupled in series from the lead 14 with the leads 15 coupled in common and the lead 16 coupled to a fixed potential or one pole of the voltage supply system. The lead 14 is preferably in the circuit of a current control device 17 such as a rheostat, potentiometer, variable resistance, or other suitable device to control current out of a voltage source 18 through the coils to the fixed or ground potential, as well understood by those skilled in the art. In this manner the current through the solenoid coils 11 and 12 is adjustable by the current control 17 to increase or decrease the flux density generated by the coils. FIG. 3 illustrates the flux density, B, in gauss relative to several ampere increments to produce the flux density profile as shown in relation to the coil width. It is to be understood that in practicing the invention paired solenoids may be used orthogonally to produce crossed horizontal and vertical fields, if desired.

Figure 2:
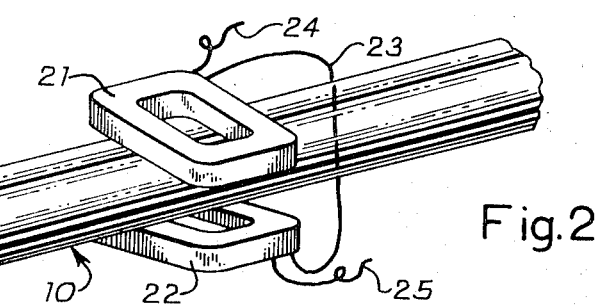
FIG. 2 illustrates solenoid coils in relative inclined or angular relation with a lasing tube therebetween.
Figure 4:
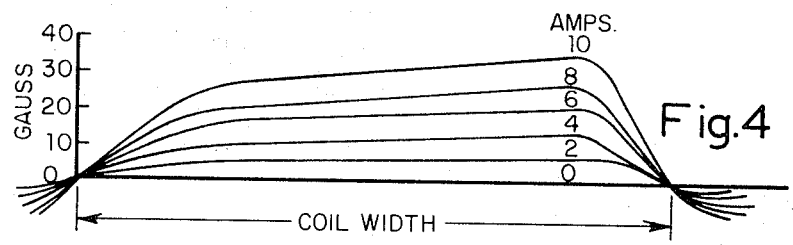
FIG. 4 illustrates in graph form the flux density with respect to coil size and current applied for about 15° angular relation of the solenoid coils.
Figure 5:
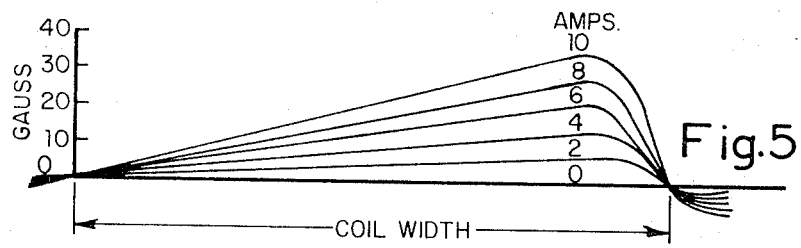
FIG. 5 illustrates the flux density with respect to current with angular relation of the air core coils similar to FIG. 4 but a greater angle, such as 30°.

Referring more particularly to FIG. 2 the lasing tube 10 is illustrated as passing between coils 21 and 22 arranged in an inlcined or angular spaced relation with the leads 23, 24, and 25 coupling the coils in series, it being understood that one of the leads 24 or 25 will be coupled through a current control device in the same manner as for the coils in FIG. 1. If the coils 21 and 22 are inclined in a relative angle of 15°, the flux density will be linear but with slope profiles in accordance with the current applied, as shown in FIG. 4, If the coils 21 and 22 are adjusted to a 30° relative angle, the flux density will provide a linear profile of sloped curves in accordance with the current applied, as shown in FIG. 5, although the coils may be adjusted to any angle of inclination to meet desired slopes or tapers of the flux field. It is to be noted that in such parallel or angular relation of the coils the fields produced are linear with current and will display a constant slope or taper for a given inclination of the coils and further will only have a positive slope across the discharge bore.

Figure 6:
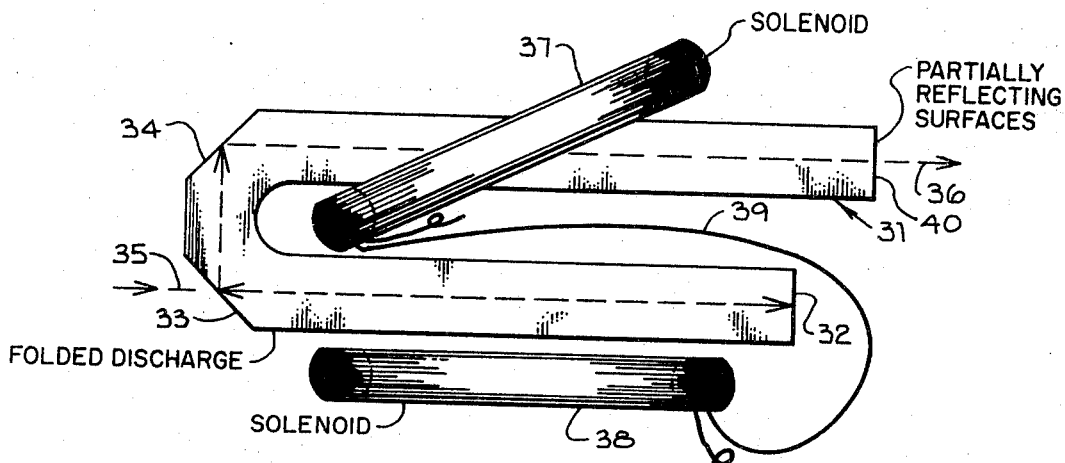
FIG. 6 illustrates a folded discharge lasing tube with solenoid coils adjustably affixed in angular relation.

Referring in particular to FIG. 6 there is illustrated a folded discharge scanning laser tube 31 having reflecting surfaces 32, 33, 34, and 40 the surface 33 and 40 being partially reflective to permit the input lasing beam 35 to pass through and be reflected on the surfaces 32, 33, and 34 and discharge as output 36. Solenoid coils 37 and 38 are coupled in series to the common lead 39, the upper coil 37 being angularly disposed with respect to the coil 38 such that the folded portion of the lasing tube 31 allows the optical path to pass through the center of the solenoid. The flux density profile would be produced as shown in FIGS. 4 and 5 but lengthwise of the lasing tube 31 for cross-field control of the lasing plasma by longitudinal increase in flux density. Since it is desirable to drive the scanning plasma with a ramp or sawtooth waveform, the displacement of the discharge 36 should be linear with current so that it is known at all times where the discharge is and by doubling the current it can be expected that the angular deflection of the discharge will be twice as great. The folded discharge laser tube 31 of FIG. 6 is of the scan laser type for which it is desirable to have the time varying field frequency to be as large as possible so that a kilocycle or greater scan rate can be achieved which is possible by air core type coils, such as the solenoids shown herein. The limiting factor for obtaining rapidly varying magnetic fields is invariably the high inductance of the device which would be encounterd with iron core electromagnets. The inductance of an air core solenoid is given by the equation:

$$L = \mu_0 n^2 l A$$

where $L$ is the inductance in henrys, $\mu$ is the permeability, $n$ is the coil turns, $l$ is the mean length in centimeters, and $A$ is the cross sectional arrangement of the magnetic path. The frequency response of Iron core electromagnets is limited and linearity of the flux density is not possible with reasonable structures. The inductance of air core coils depends on geometrical factors only, being independent of applied current. Hence, we may drive such solenoid coils at high rates using fast high current low voltage power supplies.

Figure 7:
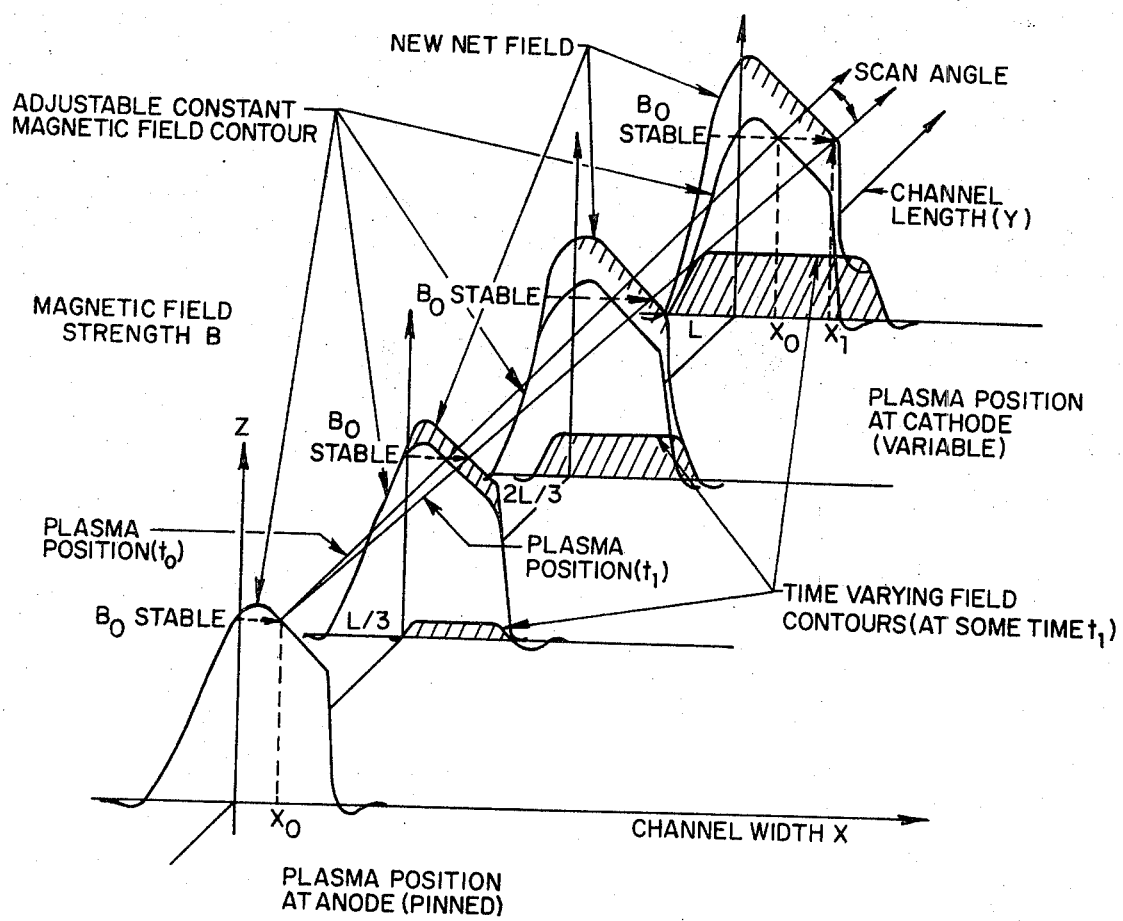
FIG. 7 illustrates a plot of the magnetic field geometry for horizontal line scanners using specially inclined air core solenoids as illustrated in FIG. 6.

Referring to FIG. 7 there is illustrated a plot of the new varying magnetic field geometry for a horizontal line scanner using the specially inclined air core solenoid, as shown in FIG. 6. Plotted in the Z direction is the magnitude of the vertical component of the applied magnetic fields as a function of channel length Y and the channel width X. The projected curves show the adjustable constant magnetic field contours with the new net field immediately thereunder. The plasma position at time $t_0$ and the plasma position at time $t_1$ are projected outwardly to show the scan angle of a scanning laser. Four positions along the channel length Y from the zero position through the one-third L position, two-thirds L position and L position illustrate the time varying field contours at some time $t_1$. At some distance $X_0$ along X, the permanent field tapers off from the B maximum condition to the value $B_0$ which is stable for both the $X_0$ and $X_1$ positions. The magnetic field strength or flux density B illustrates the plasma position at the cathode which varies as illustrated herein. This type of magnetic geometry would produce a highly linear discharge scan.

Figure 8:
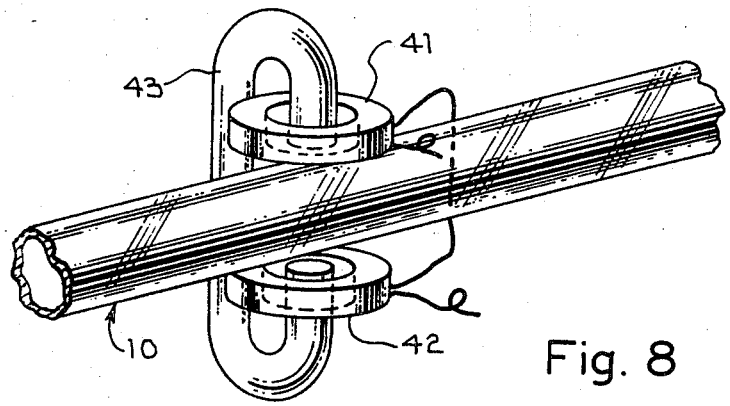
FIG. 8 illustrates the use of a permanent magnetic within solenoid coils with a lasing tube therebetween.
Figure 9:
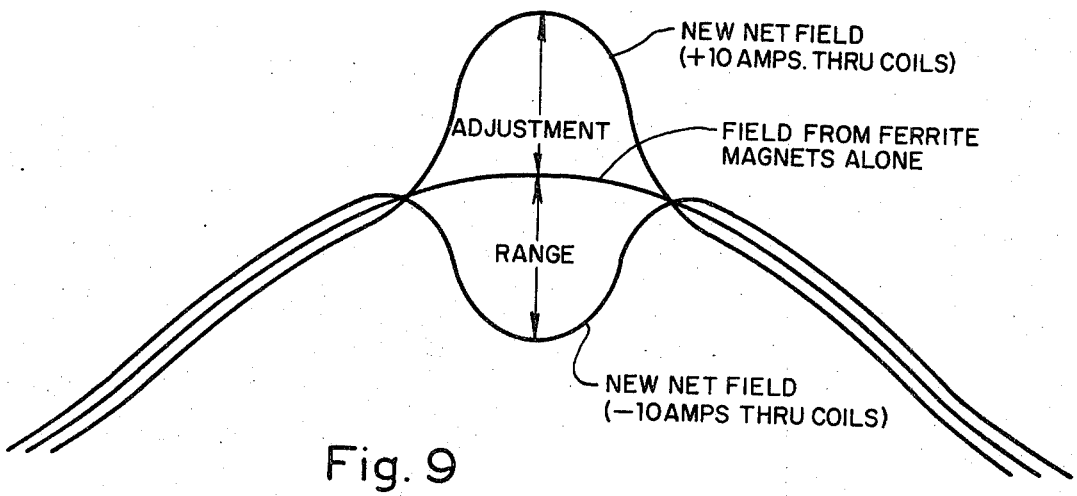
FIG. 9 plots the adjustment range of a lasing fixture as shown in FIG. 8.

Referring more particularly to FIG. 8 the lasing discharge tube 10 is illustrated as being positioned between the two solenoid coils 41 and 42 with a permanent magnet 43 having ends terminating in the air core openings of the solenoids. By this arrangement ferrite permanent magnets provide the necessary constant stabilizing field. The solenoids 41 and 42 are in series with the current control circuit in the same manner as shown in FIG. 1 to provide a means for adjusting the field flux density at the discharge by small amounts to make up for varying mixer, discharge current, flow velocity, etc. Such a "peaking adjustment" may be provided by placing the ferrite permanent magnet within the hollow coils of the solenoid coils 41 and 42 as shown and by adjusting the current in positive and negative voltage directions to produce an adjustment ragne as shown in FIG. 9. When desirable, these solenoid coils 41 and 42 may be angularly positioned to provide field slope or taper.

Figure 10:
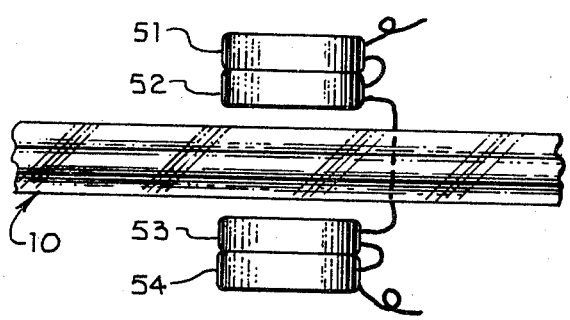
FIG. 10 illustrates stacked solenoid coils with a lasing tube therebetween.

Referring more particularly to FIG. 10 the lasing discharge tube 10 is illustrated as lying between stacked solenoids 51 and 52 in parallel arrangement with stacked solenoids 53 and 54 although such stacks may be inclined with respect to each other in the same manner as shown by the solenoids in FIG. 2 to accomplish the linearly sloped or tapered profiles as shown in FIGS. 3, 4, and 5 to obtain additional field strength with low current values. The flux denisty or gauss measurements, B, can be adjusted by the current control device.

The use of air core coils in parallel or inclined relation across the discharge plasma path of lasing tubes provide a number of advantages over the prior known electromagnetic lasing devices in that the air core devices are of lighter weight, more compact in size, and are readily adjustable for field magnitudes and taper with a very modest power input. The use of inclined or parallel air core solenoids for the generation of magnetic fields are quite suitable for use in cross-field scan lasers and cross-field lasers. The conception hereinabove disclosed for this invention provides a time varying field that is linear with distance. The air core solenoid coils may be wound to fit the odd shape of the angular discharge scan laser. The time varying field will not interfere with the laser optics and the time varying field is linear with current. The air core solenoid devices are of low inductance capable of a high rate operation. A wide gently tapering field over a large area crossing the lasing discharge tube may be easily achieved with air core coils. The advantages more pertinent to cross-field lasers alone are that there is no saturation and the field is linear with current. There is a uniform field across the gap face desirable for fields across lasing tubes. The use of air core solenoids in adjustable angular relation provide readily adjustable taper or slope of the magnetic field. The magnetic field is independent of core diameter, area, or shape. As hereinabove disclosed, the coils may be readily stacked to increase the field capability and permanent ferrite magnets may be placed within the coil where "peaking adjustment" are desirable. The use of air core coils make iron return flux paths unnecessary reducing the weight and cost in such lasing devices.

The operation of the lasing devices herein illustrated is believed obvious from the above detailed description and requires no further description of operation herein. It is believed to be understood that any of the fields desired across the lasing discharge tube 10 may be readily accomplished with good linear flux density results at inclined flux profiles lengthwise of the lasing tube or crosswise of the lasing tube in any degree of angulam relation as illustrated in FIGS. 3, 4, and 5. Accordingly, lasers discharge stabilization and beam scanning can be readily accomplished by the concept hereinabove disclosed to provide greatly improved lasing action.

While many modifications may be made in the constructional details in the placement and angular relation of air core coils to provide particular profiles of slope or taper in magnetic fields across lasing discharge tubes without departing from the invention, I desire to be limited in the spirit of my invnetion only by the scope of the appended claims.

I claim:

1. In a gas laser tube with an applied magnetic field, means for generating a varying magnetic flux field that is linear with distance comprising:

at least one pair of solenoid coils with air core centers, said solenoid coils being spaced across said laser tube to produce a transverse flux field across the gap between said coils and across said tube, means for adjusting said solenoid coils in angular relation with respect to each other to vary the slope profile of said field in a linear manner with time and distance along and across said laser tube; and means for selectively varying the current flow through said solenoid coils for producing constant linear magnetic flux field contours of chosen slopes and at adjusted field strength across said laser tube.

2. A means for generating a varying magnetic flux field as set forth in claim 1 having means for adjusting said at least one pair of solenoid coils in angular relation for producing the flux density of said field in a linear profile along the longitudinal direction of said laser tube.

3. A means for generating a varying magnetic field as set forth in claim 1 wherein said at least one pair of solenoid coils have a permanent ferrite magnet with the pole pieces terminating in the air core openings thereof whereby a stabilizing field for a peaking adjustment of said constant magnet flux field contour of chosen slope is provided.

4. A means for generating a varying magnetic flux field as set forth in claim 1 wherein said at least one pair of solenoid coils are stacked and nested pairs of solenoid coils.

* * * * *